May 10, 1938.  I. T. NELSON ET AL  2,117,007
MACHINE FOR TRIMMING ELECTROTYPE OR STEREOTYPE PLATES
Filed Nov. 4, 1937  2 Sheets-Sheet 1
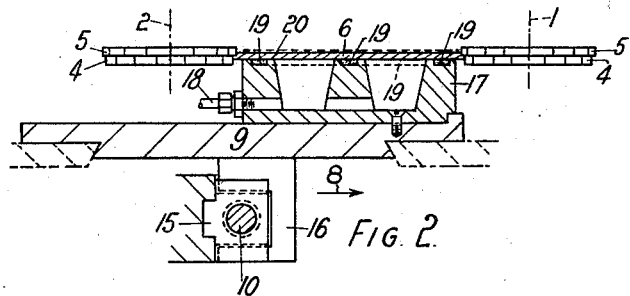
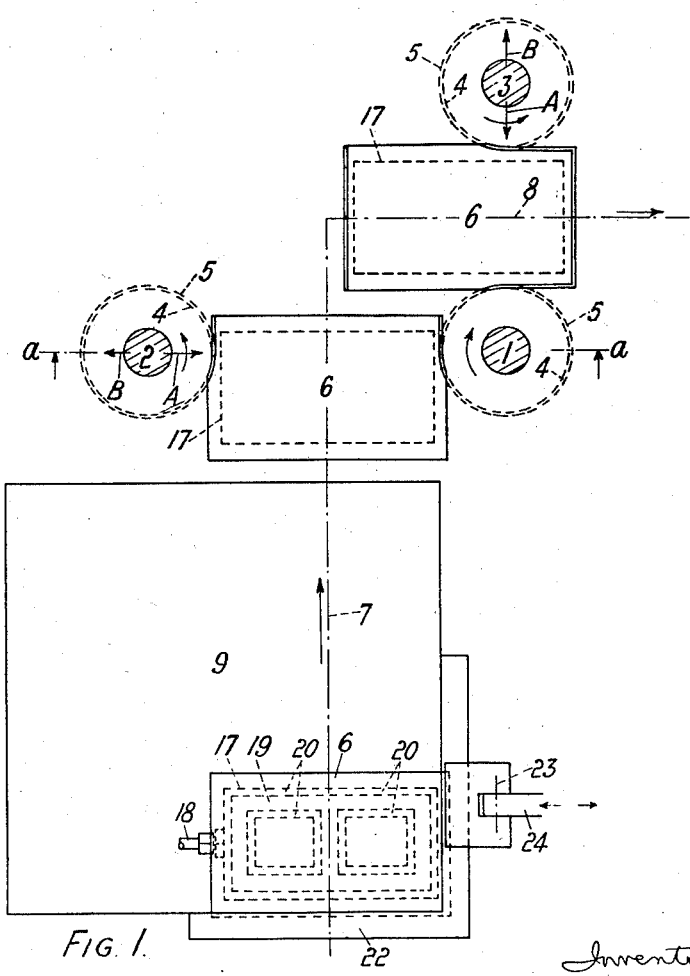

May 10, 1938.   I. T. NELSON ET AL   2,117,007
MACHINE FOR TRIMMING ELECTROTYPE OR STEREOTYPE PLATES
Filed Nov. 4, 1937    2 Sheets-Sheet 2
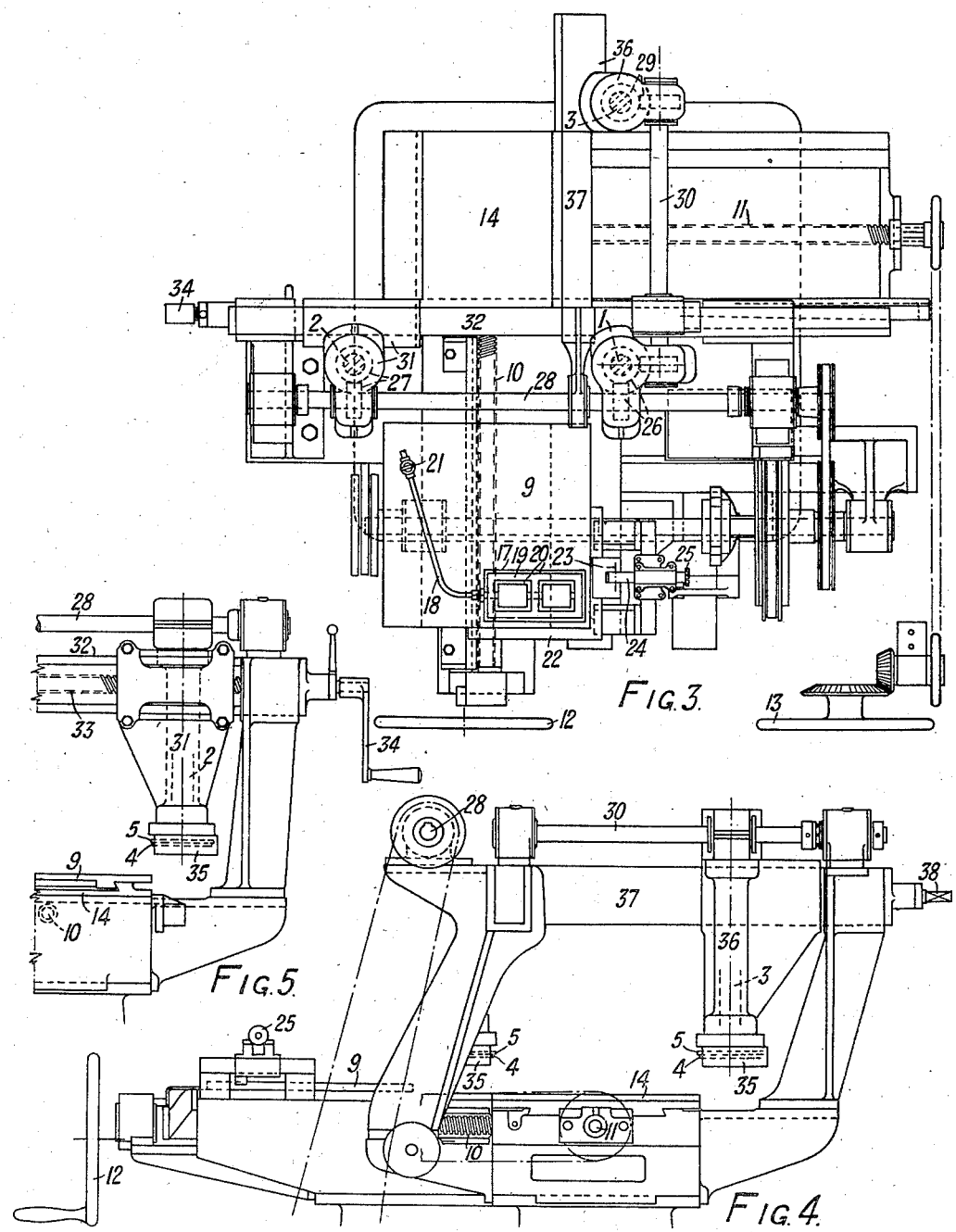

UNITED STATES PATENT OFFICE 2,117,007

MACHINE FOR TRIMMING ELECTROTYPE OR STEREOTYPE PLATES

Ian Theodore Nelson and Robert Jack, Edinburgh, Scotland

Application November 4, 1937, Serial No. 172,752
In Great Britain May 14, 1936

3 Claims. (Cl. 29—21)

The subject of this invention is a machine for trimming the edges of electrotype or stereotype plates.

A machine according to the invention includes three rotary milling cutter spindles arranged for rotation about vertical axes disposed one at each corner of an imaginary right-angled triangle with cutters adapted to trim four edges of a printing plate fed through the milling station along a path including two components disposed transversely of one another, whereby two opposed edges of the plate are trimmed simultaneously in the travel of the plate along the first component, and the other two opposed edges of the plate are trimmed simultaneously in the travel of the plate along the second component.

According to a preferred construction in which one cutter spindle, hereinafter termed the first spindle, is disposed at the corner of the right angle of the triangle, the second and third spindles are adjustable towards and away from the first spindle which latter may be immovably journalled in the frame of the machine. Each spindle is adapted to carry at its lower end at least one milling cutter devised to trim the adjacent edge of the plate to the requisite form, e. g., a bevelled edge, or a stepped edge. In operation, the plate to be trimmed is fed forwardly along the first component of its path between and past the milling cutters on the first and second spindles, and is then fed forwardly at right angles to the first component along the second component of its path between and past the milling cutters on the first and third spindles. If the plate is fed endwise initially, the side edges of the plate are trimmed first, and the head and tail edges last. The converse is true if the plate is fed sidewise initially.

Feed gear for feeding plates one at a time through the milling station may comprise a plate-carrying saddle or slide movable through the milling station by selective operation of two feed screws.

For securing the plate to the saddle we provide on the saddle a pneumatic clamp in the form of an open top vacuum box upon which the plate is placed and which is connectible to a suction pump or other air exhauster. The upper face of the box, for engagement by the plane underside of the plate, is constituted partly of metal and partly of rubber or other yielding material which extends very slightly above the level of the complementary metallic areas. When a plate is placed on the box, and the box evacuated, the plate is held securely by atmospheric pressure against the upper face of the box. To release a trimmed plate from the clamp, it is necessary only to break the vacuum, as by manipulation of a cock.

A jig is provided at the clamp-loading station to ensure correct positioning of the plate on the clamp.

A plate-trimming machine constructed in accordance with the invention is illustrated in the accompanying drawings in which Fig. 1 is a diagrammatic plan view showing the clamp-loading station, the milling station, and progressive stages of a plate-trimming operation. Fig. 2 is a part elevation, part vertical section on the line a—a of Fig. 1, showing two pairs of milling cutters operating on the head and tail ends of a plate, and showing also, in detail, the pneumatic plate-holding clamp. Fig. 3 is a plan view, Fig. 4 a side elevation, and Fig. 5 a fragmentary rear elevation, showing the general arrangement of the machine.

The plate-trimming machine shown includes three rotary milling spindles 1, 2 and 3 arranged for rotation about vertical axes and each carrying at its lower end a pair of milling cutters 4, 5. These milling cutters are adapted to trim the edges of a rectangular electrotype or stereotype plate 6 fed through the milling station along a path including two rectilinear components 7, 8 (Fig. 1) disposed at right angles to one another, whereby two opposed edges of the plate are trimmed simultaneously in the travel of the plate along the first component 7, and the other two opposed edges of the plate are trimmed simultaneously in the travel of the plate along the second component 8.

The cutters 4, which are of smaller diameter than the cutters 5, serve to trim the extreme edges of the plate, while the cutters 5, which are disposed immediately above the cutters 4, serve simultaneously to step the marginal edges, as shown in Figs. 1 and 2. Alternatively, each spindle may be provided with a single edge-bevelling cutter only.

The spindles 1, 2 and 3 are disposed one at each corner of an imaginary right-angled triangle, the spindle 1 being located at the corner of the right angle of the triangle. The spindles 2 and 3 are adjustable, as indicated by the arrows A and B, towards and away from the spindle 1, which latter is immovably journalled in the frame of the machine.

As shown in Figs. 1 and 2, the plate 6 to be trimmed is fed forwardly along the first component 7 of its path, between and past the cutters on the spindles 1, 2, and is then fed forwardly at right angles to the component 7 along the second component 8 of its path, between and past the cutters on the spindles 1, 3. In the construction shown, the head and tail edges of the plate are trimmed first in the passage of the plate between the spindles 1 and 2, and the side edges of the plate are trimmed last in the passage of the plate between the spindles 1, 3. It will be understood, however, that, if desired, the side edges of the plate may be trimmed first.

During the trimming operation the plate 6 is held on a saddle or slide 9 which is displaceable along the component 7 by actuation of a screw 10, and along the component 8 by actuation of a screw 11, the screws 10, 11 being operable by means of handwheels 12, 13, respectively, (Fig. 3). In its movement along the component 8 the saddle 9 is carried by a second saddle or slide 14 which is operated by the screw 11 and which receives the saddle 9 in the forward movement of the saddle 9 along the component 7. The saddle 9 is propelled along the component 7 by a shouldered non-rotary nut 15 (Fig. 2) on the screw 10, the nut 15 being engaged by a yoke 16 depending from the saddle 9. The yoke 16 is disengaged from the nut 15 when the saddle 14, together with the saddle 9, commences to advance along the component 8, and is re-engaged with the nut 15 when the saddle 14 is restored to initial position with the saddle 9 thereon.

For securing the plate 6 to the saddle 9 there is provided on said saddle a pneumatic clamp in the form of an open top vacuum box 17 (Figs. 1, 2 and 3) upon which the plate 6 is placed at the clamp-loading station and which is connectible by way of a pipe 18 to a suction pump or other air exhauster. The upper face of the box for engagement by the plane underside of the plate is constituted partly of metal and partly of rubber 19 or other yielding material which extends very slightly above the level of the complementary metallic areas 20. When a plate is placed on the box, and the box evacuated, the plate is held securely by atmospheric pressure against the upper face of the box. To release a trimmed plate from the clamp, it is necessary only to break the vacuum, as by manipulation of a cock 21 (Fig. 3) fitted to the pipe 18.

An angle gauge 22 is provided at the clamp-loading station to ensure correct positioning of the plate 6 on the clamp, the plate being positioned on the clamp, for example, by referring its headline and its fore-edge to the respective limbs of the gauge 22. The gauge is hinged at 23 to a micro-adjustable member 24 which is movable by rotation of a knurled nut 25 whereby to adjust the gauge transversely of the component 7. The hinge connection 23 permits the gauge to be swung upwardly out of the way of the clamp, as required.

The spindles 1, 2 are driven through spiral gearing 26, 27 (Fig. 3) from an overhead driving shaft 28, and the spindle 3 is driven through spiral gearing 29 from an overhead shaft 30 driven from the spiral gear drive 26 of the spindle 1.

The milling head structure indicated generally at 31 which carries the spindle 2 is guided for adjusting movement on a rail 32 and is operatively connected to a screw 33 (Fig. 5) rotatable by means of a crank handle 34 whereby to displace the spindle 2 towards and away from the spindle 1. Similarly, the spindle 3 is carried by a milling head structure 36 guided for adjusting movement on a rail 37 and operatively connected to an adjusting screw the end of which for engagement by a crank handle is indicated at 38 (Fig. 4).

The cutters 4, 5 are partially shrouded by segmental guards 35 carried by the respective milling head structures.

We claim:—

1. A machine for trimming the edges of printing plates, including, at a milling station, three rotary milling spindles spaced apart from one another and adapted to trim four edges of a plate fed through the milling station along a path including two components disposed transversely of one another, whereby two opposed edges of the plate are trimmed simultaneously in the travel of the plate along the first component, and the other two opposed edges of the plate are trimmed simultaneously in the travel of the plate along the second component, a pneumatic plate-holding clamp against which the plate is held by atmospheric pressure during the edge-trimming operation, a slide upon which the clamp is mounted and which travels along both components of the path of the plate, and a second slide which carries the first-mentioned slide along the second component of the path.

2. A machine for trimming the edges of printing plates, including, at a milling station, three rotary and relatively adjustable milling spindles arranged for rotation about vertical axes disposed one at each corner of an imaginary right-angled triangle with cutters adapted to trim four edges of a plate fed through the milling station along a path including two components disposed transversely of one another, whereby two opposed edges of the plate are trimmed simultaneously in the travel of the plate along the first component, and the other two opposed edges of the plate are trimmed simultaneously in the travel of the plate along the second component, a pneumatic plate-holding clamp against which the plate is held by atmospheric pressure during the edge-trimming operation, a slide upon which the clamp is mounted and which travels along both components of the path of the plate, and a second slide which carries the first mentioned slide along the second component of the path.

3. A machine for trimming the edges of printing plates, including, at a milling station, three rotary milling spindles spaced apart from one another and adapted to trim four edges of a plate fed through the milling station along a path including two components disposed transversely of one another, whereby two opposed edges of the plate are trimmed simultaneously in the travel of the plate along the first component, and the other two opposed edges of the plate are trimmed simultaneously in the travel of the plate along the second component, a plate-holding clamp for clamping the plate during the edge-trimming operation, a slide upon which said clamp is mounted and which travels along both components of the path of the plate, and a second slide which carries the first-mentioned slide along the second component of said path.

IAN THEODORE NELSON.
ROBERT JACK.